Dec. 19, 1933.  E. J. GETTINGER  1,940,541
AIR HUB WHEEL
Filed July 15, 1932
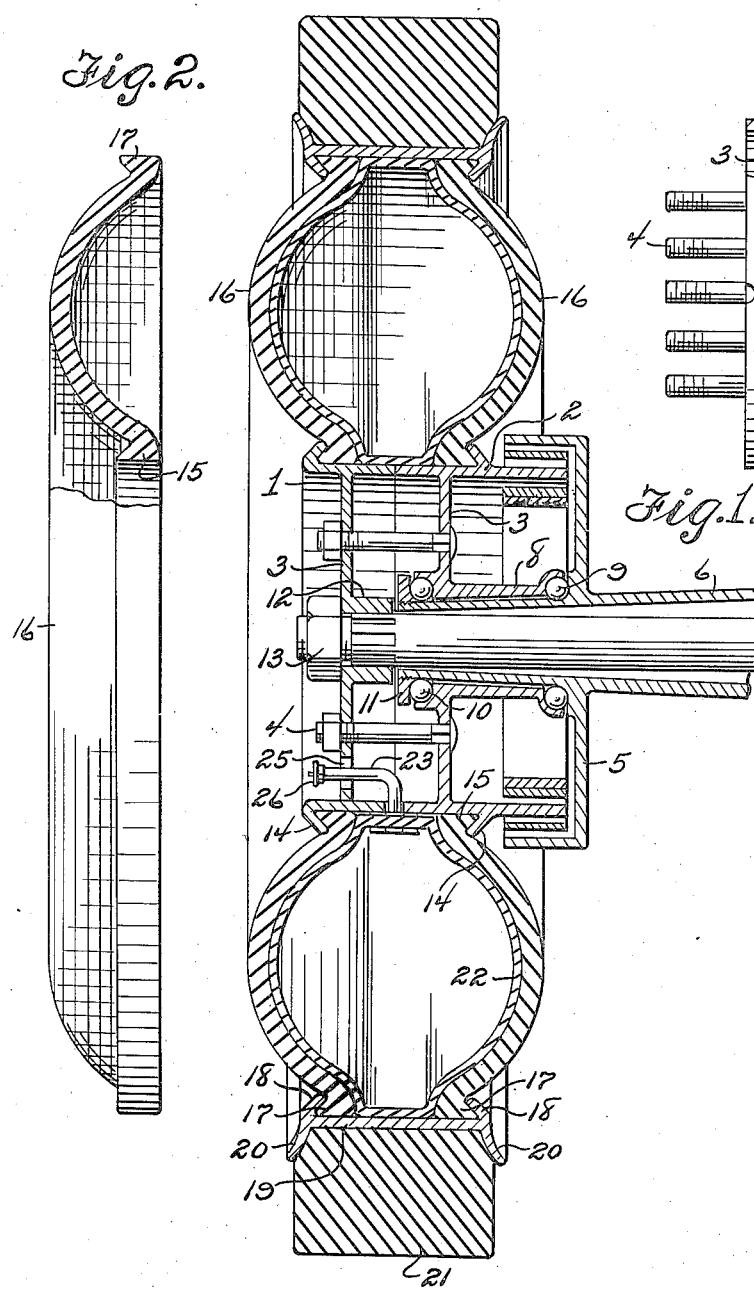
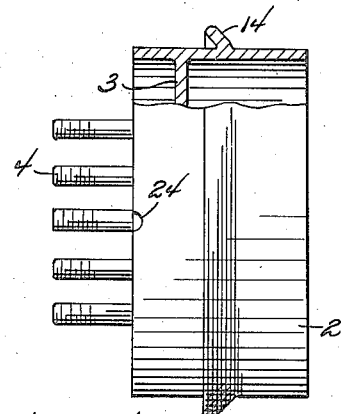
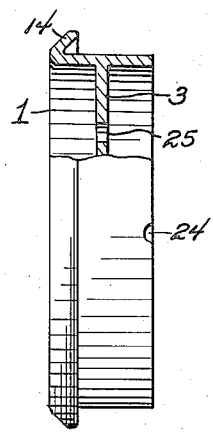
Edward J. Gettinger
INVENTOR
BY Victor J. Evans & Co.
ATTORNEY Patented Dec. 19, 1933

1,940,541

UNITED STATES PATENT OFFICE 1,940,541

AIR HUB WHEEL

Edward J. Gettinger, Lutesville, Mo.

Application July 15, 1932. Serial No. 622,728

1 Claim. (Cl. 301—6)

My present invention has reference to a wheel for vehicles, and my object is the provision of a solid tire wheel which is elastically cushioned and which wheel is of such construction as to render the same puncture proof, to insure the gripping thereof with the ground surface to avoid skidding, etc., and which is also of a construction that will last the life of the vehicle upon which it is arranged.

To the attainment of the foregoing and many other objects which will appear as the nature of the invention is more fully disclosed the improvement resides in the novel construction, combination and operative association of parts, one satisfactory embodiment of which is disclosed by the accompanying drawing.

In the drawing:

Figure 1 is an approximately central transverse sectional view through a wheel in accordance with this invention.

Figure 2 is a side elevation of the casing, with parts broken away and parts in section.

Figure 3 is a similar view of one of the hub sections.

Figure 4 is a similar view of the other hub section.

As disclosed by the drawing the hub of my improved wheel is made up of two annular sections. The outer section is indicated by the numeral 1, and the rear or inner section by the numeral 2. Both of the hub sections 1 and 2 are provided with webs or flanges 3—3, respectively, the said flanges having alining openings through which pass bolts 4 that are engaged by suitable nuts. The ring of the section 2 is of a greater width than the section 1 so that the outer portion thereof constitutes a brake drum which receives thereover the flange of a backing plate 5. Inner brake shoes may contact with the inner periphery of the brake drum formed on the hub section 2 and the backing plate is preferably formed on the housing 6 for the axle 7 of the vehicle.

The section 2 is centrally formed with a rearwardly extending annular portion 8 through which the housing 6 is received, and there is a raceway for anti-friction balls 9 between the backing plate and the said extension 8. The outer face of the web 3 of the hub section 1 is also formed with an extension that affords a raceway for anti-friction balls 10, the balls being held in place by a wing nut 11 that is screwed on the outer end of the housing 6, the nut 11 affording the second element of the raceway for the anti-friction walls 10. The web 3 of the outer hub section 1 is centrally provided with an inwardly extending annular flange 12 for the reception of the axle 7. This flange 12 is provided with suitable ribs and grooves to coengage with similar ribs and grooves on the end of the axle 7 and the axle 7 is held in place by a nut 13.

Both of the hub sections 1 and 2 have on their outer periphery outwardly directed inwardly inclined clincher rings 14—14, and these clincher rings are designed to receive therein the inner beaded ends 15 on a vulcanized rubber casing. The casing 16 is of two sections and, of course, is in the nature of an annulus and the outer ends of the said sections are provided with beads 17 to be received in clincher rings 18 formed on the inner edges of a metal rim 19. The metal rim has upwardly extending flanges 20 to receive therebetween a solid and preferably vulcanized tread 21.

The casing sections 16 are bulged outwardly from their beaded ends 15 and 17 and the said sections receive therebetween a pneumatic tube 22 of the usual construction. The tube has fixed on the inner periphery thereof a right-angular tube or stem 23 that passes through alining notches 24 in the hub sections 1 and 2. The outer or horizontal flange of the hollow stem 23 passes through an opening 25 in the flange 3 of the outer hub section 1. This horizontal branch has arranged therein a self-closing valve of the Schrader type and the outer end of the said stem is threaded so that the valve is normally covered by a cap 26 that is screwed on the said end of the stem. The parts constituting the wheel may be easily and quickly assembled and rigidly connected to afford a unitary structure. The inner tube 23 is inflated in the usual manner and as the outer periphery of the tube is in direct contact with the rim 19 the tire or tread 21 is effectively cushioned. The tire is afforded the desired resiliency so that no shocks or jars will be imparted to the vehicle equipped with the wheel. The casing 16 takes the place of spokes in an ordinary wheel or takes the place of discs in a disc wheel. The wheel is practically puncture proof as the casings 16 are vulcanized and, therefore, of hardened rubber. The construction is strong and the arrangement of the parts is such that the wheel will outlast the life of the vehicle on which it is arranged.

Having described the invention, I claim:

A wheel comprising abutting ring-like members to support cushion means of a wheel, annular webs formed on the inner faces of said members and spaced from each other, fasteners detachably connecting the webs, one of said ring-like members being of a greater width than the other ring-like member to provide a brake drum, a sleeve-like extension on one of the webs and journaled on an axle housing, anti-friction means between the extension and the housing, a tubular flange formed on the other web and in alignment with the sleeve-like extension to receive the axle of the housing and splined to said axle, and a nut engaging the last-named web and secured to the axle.

EDWARD J. GETTINGER.